March 11, 1947.　　　F. R. McFARLAND　　　2,417,316
KING PIN AND SPINDLE ARRANGEMENT FOR STEERABLE WHEELS
Filed Nov. 11, 1943　　　2 Sheets-Sheet 1
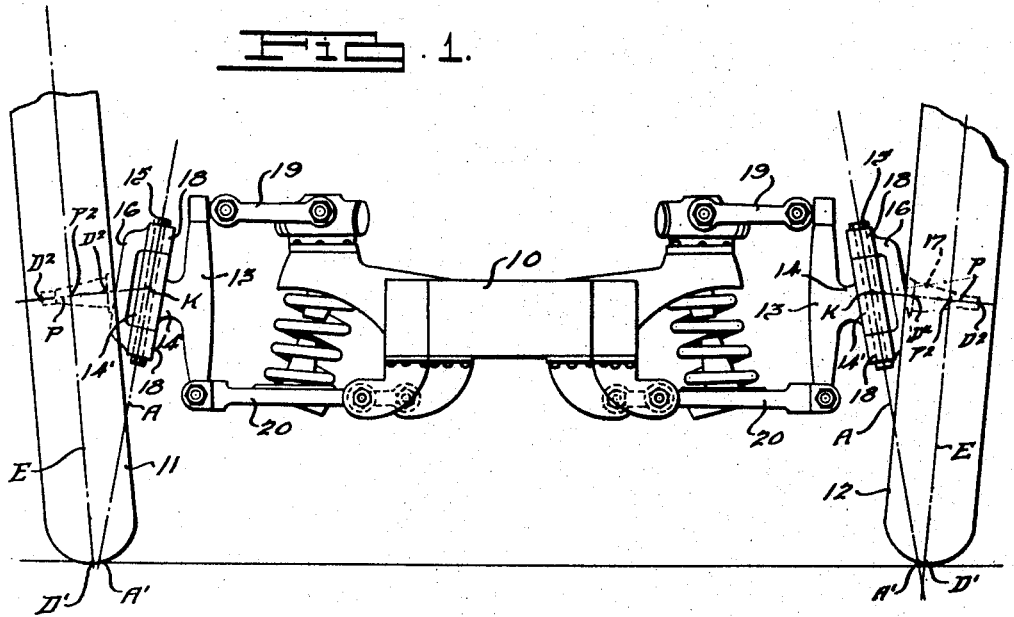
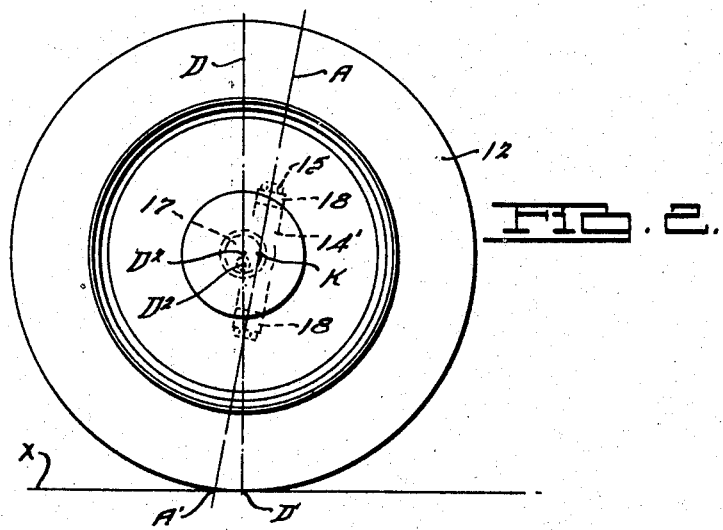
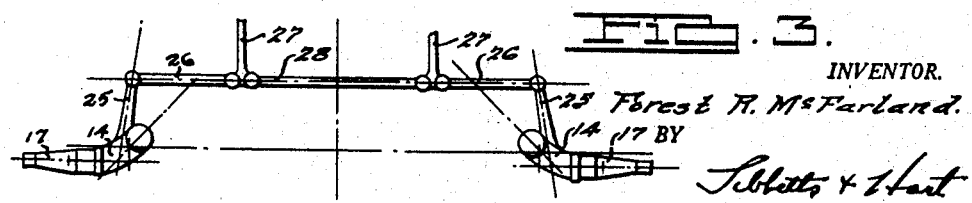
INVENTOR.
Forest R. McFarland.
BY
Sibbett & Hart
ATTORNEYS.

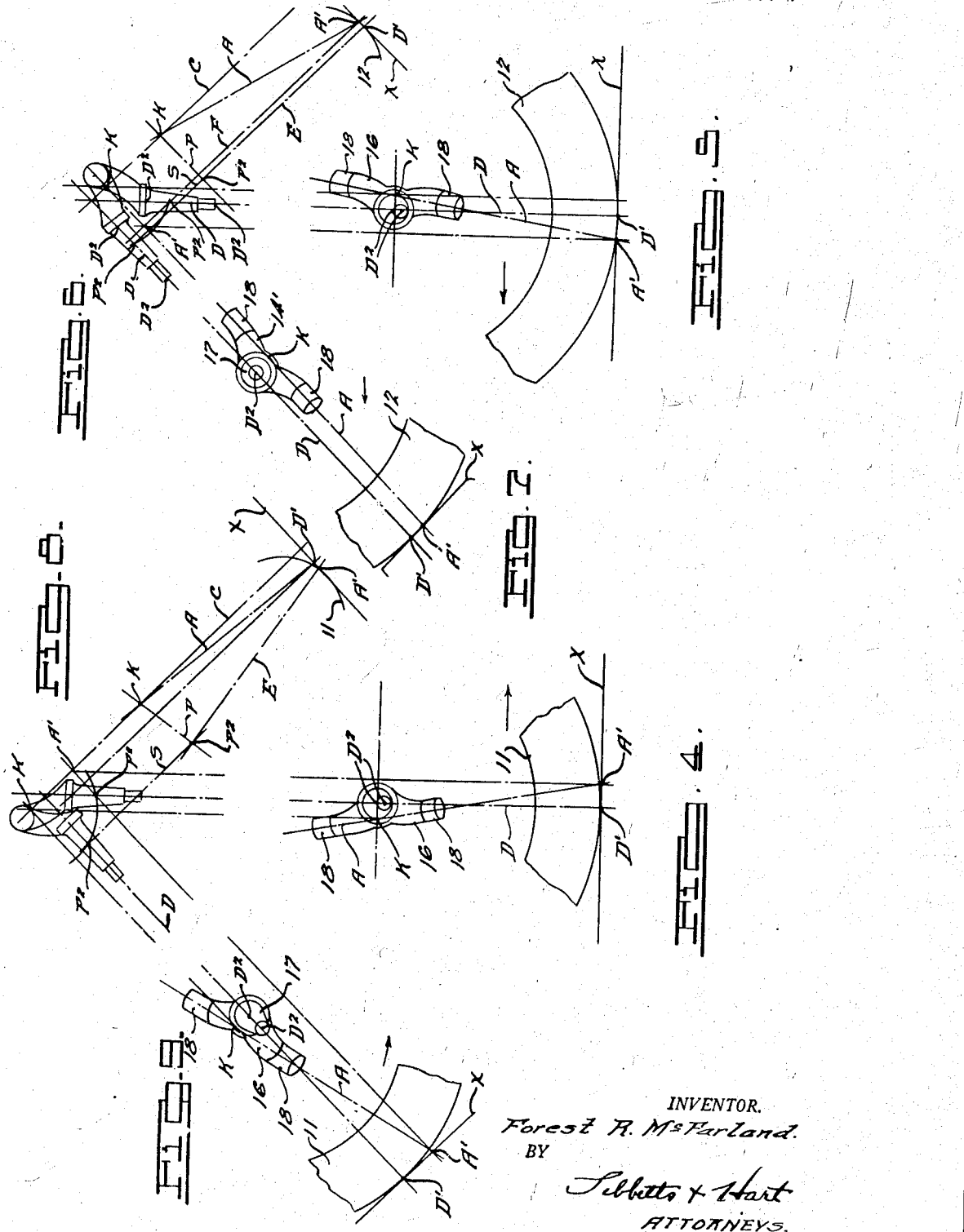

Patented Mar. 11, 1947

2,417,316

UNITED STATES PATENT OFFICE 2,417,316

KING PIN AND SPINDLE ARRANGEMENT FOR STEERABLE WHEELS

Forest R. McFarland, Huntington Woods, Mich., assignor to Packard Motor Car Company, Detroit, Mich., a corporation of Michigan Application November 11, 1943, Serial No. 509,917

3 Claims. (Cl. 280—96.2)

This invention relates to vehicles and more particularly to mechanism for mounting steering ground wheels.

It is the usual practice with road vehicle to mount the front steering ground wheels so that they will have both caster and camber. The angle of the king pin axis to the vertical centerline of the wheel in the side elevation determines the caster of the wheel and the angle of the wheel carrying spindle to horizontal determines the camber of the wheel. When the extended axis of the king pin intersects the ground surface ahead of the intersection of the vertical centerline of the wheel in the side elevation, the caster is positive, and when the extended axis of the king pin intersects the ground rearwardly of the intersection of the vertical centerline of the wheel, the caster is negative. It is the usual practice to arrange the king pin axis so that the top tilts inwardly toward the vehicle as well as rearwardly.

It has been the general practice to provide the steering ground wheels with positive caster so that they will trail the king pin axis thereby assisting the operator in maintaining a straight steering course. Positive caster has the disadvantage during turning movement of increasing the torque application required due to centrifugal force acting to maintain direct forward motion of such wheel. To overcome this disadvantage negative caster has been resorted to, resulting in increasing the camber of the outside wheel and decreasing the camber of the inside wheel causing tire wear and squeal.

It is an object of this invention to provide mechanism arranged to take advantage of desirable positive wheel caster in the straight ahead position and to eliminate the more important undesirable effects on the turn.

Another object of the invention is to provide a vehicle steering mechanism arranged to have a turning range in which the wheel furthest from the direction in which the vehicle is steered has a positive caster in straight ahead position and with the positive caster gradually reducing and changing to negative caster as turning of the wheel for steering continues.

Another object of the invention is to provide steering mechanism for a pair of front vehicle wheels having a mounting that will provide positive caster and camber of the wheels for straight ahead travel and that will cause the outside wheel from either direction of turn to tilt and reduce its camber angle in the direction of the turn and that will increase the camber angle of the inside wheel.

Other objects of the invention will appear from the following description taken in connection with the drawings, which form a part of this specification, and in which:

Fig. 1 is a front elevational view of a motor vehicle chassis having the invention incorporated therein;

Fig. 2 is a side elevational view of one of the front wheels and its mounting showing the caster angle;

Fig. 3 is a fragmentary plan view of steering gear mechanism for turning the knuckles;

Fig. 4 is a diagrammatic view of the knuckle and wheel taken from the left side of Fig. 1, in position for straight steering;

Fig. 5 is a diagrammatic view of the wheel at the right of Fig. 1 with lines showing caster in straight ahead position;

Fig. 6 is a diagrammatic view showing the wheel knuckle in Fig. 5 in plan view when in straight ahead position, when in position for a right turn and in front elevation when in position for a right turn.

Fig. 7 is a side elevation of the wheel projected from the portion of Fig. 6 showing the wheel in position for right turn.

Fig. 8 is a diagrammatic view showing the wheel knuckle in Fig. 4 in plan view when in straight ahead position, when in position for a right turn and in front elevation when in position for a right turn.

Fig. 9 is a side elevation of the wheel projected from the portion of Fig. 8 showing the wheel in Fig. 4 in position for right turn.

In the drawings, reference character 10 represents the base portion or frame of a motor vehicle, the engine and driving mechanism being omitted for clarity since they are well known in the art and may be of any desired form and arrangement.

The invention is illustrated in connection with the forward end of a motor vehicle having a pair of steering ground wheels 11 and 12, each wheel being carried by a supporting means at the side of the frame. As the supporting means are similar, the same reference characters will be employed for each. A carrier member 13 extending substantially vertically has an offset arm 14 with a portion 14' through which king pin 15 extends. A steering knuckle is mounted to swivel relative to the arm and consists of a bracket 16 and a spindle 17 on which a wheel is rotatably mounted. The knuckle bracket has journal portions 18 arranged to align with the portion 14' of the carrier arm and the king pin extends through the aligned portions 14' and 18. The top portion of the carrier member 13 is connected with the vehicle frame by link 19 and the bottom portion of such member is connected with the frame by link 20. These links are parallel and are arranged to maintain the carrier member 13 in substantially vertical position during all vehicle operating conditions.

Conventional mechanism for swinging the knuckles on the king pins to steer the vehicle is shown in Fig. 3. The knuckle brackets each have a steering arm 25 extending therefrom and such arms have links 26 pivotally connected thereto. Bell cranks 27 are connected to links 25 and link 28 connects the bell cranks. The bell cranks can be pivoted to the frame in parallel relation and conventional mechanism (not shown) can be attached to one of the bell cranks for swinging the same to shift the links and the steering arms.

The king pin 15 extends at an angle to vertical with the top tilted inwardly toward and rearwardly of the vehicle as indicated by axis line A. The spindle 17 is arranged with its axis, indicated by line P terminating at points $D^2$, $D^2$, at an angle to horizontal and offset in advance of axis A of the king pin in a horizontal plane. Thus, the axis of the wheel, which coincides with the spindle axis P, will be ahead of the king pin axis A in a horizontal plane, as shown in Figs. 2, 4 and 5. The vertical centerline of the wheel, in side elevation, is indicated by line D and, as shown in Figs. 2, 4 and 5, the position of line A relative to line D indicates the caster angle of the wheel. So long as this line A contacts the ground surface X forwardly of the line D, caster will be positive but when line A contacts the ground surface rearwardly of line D then caster will be negative.

Lines E in Fig. 1 illustrate the centerlines of the wheels in front elevation and the angle between lines E and a vertical line determines the degree of wheel camber when the wheels are in position for straight steering.

When the wheels are turned on the king pins to steer the vehicle to the right or left when moving forwardly, the wheel furthest from the direction of the turn will be known as the outside wheel and in Figs. 4 and 5 the direction of vehicle travel is indicated by an arrow. As the wheels are turned for steering, centrifugal force tends to continue forward motion of the outside wheel in the direction of previous vehicle travel and with the wheel mounting now generally employed, the camber angle of the outside wheel is increased causing excessive tire wear and squealing tire noise.

With the wheels mounted as described herein, operation of the steering gear to make a turn, during forward progress of the vehicle, will cause the outside wheel to straighten up and reduce the camber angle. This result is obtained by the angle of the king pin and the placement of the wheel axis in advance of the king pin axis causing the wheel spindle to move in a path whereby the net positive caster effect is reduced to zero and then to negative caster as the wheel is turned in its range of pivotal movement toward the desired direction of vehicle travel.

Referring to Fig. 5, wheel 12 and its supporting knuckle member are shown in side elevation and for straight forward steering of the vehicle. The king pin axis A, when extended, meets the ground surface X at point $A^1$ while the vertical centerline D of the wheel meets the ground surface at point $D^1$. It will be noted that point $D^1$ is behind point $A^1$ thus providing positive wheel caster. The wheel axis coincides with the axis P of spindle 17 extending at an angle to horizontal between points $D^2$—$D^2$ denoting the centers of the ends of the spindle. The small end of the spindle is lower than the large end and thus the spindle projects downwardly from horizontal. In a horizontal plane the king pin axis extends at the rear of the spindle axis and K denotes a point on the king pin axis in a horizontal plane with point $D^2$ at the large end of the spindle. Referring to Fig. 1, letter E represents the vertical centerline through the wheels in front elevation, so obviously the positive camber is the angle at which line E extends relative to vertical.

In Fig. 6, points $A^1$ and K and line D are projected from Fig. 5 to indicate the spindle and king pin positions in plan view for straight forward steering and in position turned to extreme right. $P^2$ denotes the center point of the axis of the wheel carrying portion of the spindle which coincides with the centerline E of the wheel.

Fig. 7 is projected from the knuckle in Fig. 5 turned to extreme right position and shows wheel 12 and its knuckle member in side elevation when turned to extreme position for steering the vehicle to the right during forward progress. Point K, lines D and A are projected from Fig. 6, line D being obtained from the axis P on the king pin and line A from point K on the king pin axis. It will be noted that points $D^2$ now substantially coincide indicating that the spindle axis P is in substantially a horizontal plane with point K, and that the ground contact point $D^1$ of the wheel centerline has shifted in advance of point $A^1$ on the king pin extended axis. Thus the caster has become negative. In the range of turning from straight ahead to extreme right steering, the positive caster reduces to zero during the major portion of the turning range and thereafter becomes increasingly negative.

In Fig. 6, a construction line C is projected from point K, in the plan view, at a 90° angle to the spindle axis line in the turned position. Ground line X is established 90° to line C and point K on line C is determined by the distance between point K and the ground line in Fig. 1. Line F is projected from point $A^1$ in the plan view in Fig. 6 and extends parallel with line C. The intersection of line F with ground line X provides point $A^1$ and line A extends through points K and $A^1$ showing the axis of the king pin. Point $P^2$ on the wheel is obtained by dropping a line S from point $P^2$ on the turned knuckle member in Fig. 6 at 90° to line D. $D^1$ is established on the ground line X by laying off the offset of $D^1$ to $A^1$ in Fig. 1 on the ground line in Fig. 6. Then the distance between points $D^1$ and $P^2$ in Fig. 1 is measured on line S from the point $D^1$ on the ground surface X to establish point $P^2$ and line E is drawn between $D^1$ and $P^2$. The spindle axis P will extend through point $P^2$ on line S and point K on line C. It will be noted that the spindle axis is substantially horizontal with the result that the camber is substantially zero. The spindle has shifted in a path to tilt the upper portion inwardly toward the vehicle without changing the distance between the frame and the ground contacting portion of the wheel.

When the vehicle is steered to the left in its forward progress, wheel 11 will be the outside wheel and it will be tilted in the same manner as wheel 12 when turning to the right.

The caster range of the inside wheel is of little consequence as the vehicle front end weight is shifted mainly to the outside wheel. The camber and caster ranges of the inside wheel in turning to the right is illustrated in Figs. 4, 8 and 9. The characters utilized in this illustration are the same as those used in Figs. 5, 6, and 7, and Figs. 4, 8 and 9 are views similar to Figs. 5, 6, and 7, except that a front elevation is shown in place of the rear elevation in Fig. 6. The side and plan views in Figs. 4 and 8 are identical with Figs. 5 and 6. Upon turning wheel 11 to the inside the point $D^1$ recedes from point $A^1$ showing that the positive caster is increased and the positive camber is likewise increased because the angle of the spindle axis as shown by line $D^2$, $D^2$ to horizontal increases. The distance between points $A^1$ and $D^1$ on wheel 11 is the same in Figs. 2 and 4 and thus the ground contact of the wheel relative to the frame remains substantially constant. The ground engaging portion of this wheel will not shift.

When the vehicle is turned to the left in forward progress, wheel 11 will be outside and wheel 12 will be inside. The action of the wheels in this instance will be the same as previously described, wheel 11 will act as shown in Figs. 5 to 7 and wheel 12 will act as shown in Figs. 4, 8 and 9.

This mounting for the wheels adds to the life of the tires and reduces the physical effort required in steering a vehicle.

It will be understood that various forms of the invention other than that described above may be used without departing from the spirit or scope of the invention.

What is claimed is:

1. In a vehicle, a frame, carriers connected for vertical motion at the sides of the frame, steering knuckles supported by the carriers, pivotal connections between the carriers and the knuckles having the top portions tilted inwardly toward and rearwardly of the frame, the wheel carrying spindle portions of the knuckles having their axes extending downwardly from horizontal and offset so that they are in advance of the pivotal connections in a horizontal plane, and steering means operable to swing the knuckles in the same direction on their pivots, the ground contact of the wheels remaining substantially the same distance from the frame in the steering turning range, the inward and rearward inclination of the king pins and forward position and inclined arrangement of the spindles being such that the camber and caster of the inside wheel increases and the camber and caster of the outside wheel decreases as the wheels are turned from straight ahead position within the steering range.

2. In a mounting for the steering wheels of a vehicle, wheel carriers connected to the vehicle, a steering knuckle for each of said carriers, means for turning the steering knuckles for steering the vehicle, each said knuckle having a king pin connection to its carrier the axis of which king pin is inclined inwardly and rearwardly, each said knuckle having a spindle offset forwardly of the king pin and having its axis at an angle to provide camber for the vehicle wheel, the inward and rearward inclination of the king pins and the forward position and inclined arrangement of the spindles being such that positive caster is provided when the wheels are in straight ahead position and the positive caster of the outside wheel in making a turn is changed to negative caster while the camber is decreased and the positive caster of the inside wheel in making a turn is increased while the camber also is increased.

3. In a vehicle, a frame, carriers connected for vertical motion at the sides of the frame, steering knuckles supported by the carriers, pivotal connections between the carriers and the knuckles having the top portions tilted inwardly toward and rearwardly of the frame, the wheel carrying spindle portions of the knuckles having their axes extending downwardly from horizontal and offset so that they are in advance of the pivotal connections in a horizontal plane, and steering means operable to swing the knuckles in the same direction on their pivots, the ground contact of the wheels remaining substantially the same distance from the frame in the steering turning range, the said carrier-to-frame connection insuring substantially unchanged caster and camber as the wheels move vertically relative to the frame, and the inward and rearward inclination of the king pins and the forward position and inclined arrangement of the spindles being such that the camber and caster of the inside wheel increases and the camber and caster of the outside wheel decreases as the wheels are turned in either direction from straight ahead position.

FOREST R. McFARLAND.

REFERENCES CITED

The following references are of record in the file of this patent:

UNITED STATES PATENTS

| Number | Name | Date |
| --- | --- | --- |
| 1,493,683 | Lavoie | May 13, 1924 |
| 2,099,114 | Holmes | Nov. 16, 1937 |
| 723,975 | Ball | Mar. 31, 1903 |
| 2,092,612 | Olley | Sept. 7, 1937 |

FOREIGN PATENTS

| Number | Country | Date |
| --- | --- | --- |
| 453,808 | British (Maier) | Sept. 18, 1936 |
| 637,265 | French (Garbe) | Jan. 28, 1828 |